United States Patent [19]

Duguay et al.

[11] Patent Number: 4,763,019

[45] Date of Patent: Aug. 9, 1988

[54] APPARATUS COMPRISING HARMONIC GENERATION MEANS

[75] Inventors: Michel A. Duguay, Fair Haven; Joseph S. Weiner, Summit, both of N.J.

[73] Assignee: American Telephone and Telegraph Company, AT&T Bell Laboratories, Murray Hill, N.J.

[21] Appl. No.: 905,278

[22] Filed: Sep. 9, 1986

[51] Int. Cl.$^4$ ............................................. H03F 7/00
[52] U.S. Cl. .................................. 307/427; 350/96.12
[58] Field of Search ...................... 307/427; 350/96.12

[56] References Cited

U.S. PATENT DOCUMENTS

| | | | |
|---|---|---|---|
| 3,430,061 | 2/1969 | Smith | 307/88.3 |
| 3,619,795 | 4/1970 | Marcatilli | 330/4.6 |
| 3,830,654 | 8/1974 | Cho | 117/201 |
| 4,427,260 | 1/1984 | Puech et al. | 307/427 X |

OTHER PUBLICATIONS

"Device Promises Denser Optical Disks", *Electronics*, Charles L. Cohen, Jul. 10, 1986, pp. 36–37.

"Non-Linear Effects in LiNbO$_3$ Waveguides", *Integrated Optical Circuit Engineering II*, M. Papuchon, 1985, pp. 150–155.

"Efficient Phase-Matched Second-Harmonic Generation Method in Four-Layered Optical-Waveguide Structure," *Optics Letters*, vol. 2, No. 6, Ito et al., 6–78, pp. 139–141.

*Primary Examiner*—James W. Davie
*Attorney, Agent, or Firm*—Eugen E. Pacher

[57] ABSTRACT

Disclosed is apparatus comprising a source of pump radiation, a multilayer planar waveguide structure that can serve as an efficient harmonic generator, parametric amplifier or parametric oscillator, and means for utilizing the radiation generated in the waveguide structure. The structure consists of a multilayer core region bounded above and below by a (typically optically linear) cladding region. The core region comprises two optically nonlinear layers separated by an optically linear spacer. The layer thickness and refractive indices are selected such that, at a pump frequency $f_o$, the effective index of the core region is greater than the respective refractive indices of the cladding regions, that the refractive indices of the two nonlinear layers are greater than the refractive index of the spacer, and that a predetermined mode of pump radiation is phasematched with a predetermined mode of a second radiation at a frequency $\neq f_o$, with more than 50% of the total energy of the second frequency radiation propagating in a subset of the layers of the core region that does not comprise the spacer and one of the two nonlinear layers. In an exemplary embodiment, the bottom cladding region is a substantially monocrystalline layer of approximate composition $Ca_{0.5}Sr_{0.5}F_2$, the core region consists of three substantially monocrystalline layers (108 nm $Al_{0.4}Ga_{0.6}As$/92.5 nm $Ca_{0.5}Sr_{0.5}F_2$/120 nm $Al_{0.78}Ga_{0.22}As$), and the top cladding region is $Ta_2O_5$), with the subset consisting of the 108 nm nonlinear layer.

12 Claims, 2 Drawing Sheets

APPARATUS COMPRISING HARMONIC GENERATION MEANS

FIELD OF THE INVENTION

This invention pertains to means for generating harmonic radiation of pump electromagnetic radiation and/or for parametrically amplifying signal radiation, and to apparatus comprising such means.

BACKGROUND OF THE INVENTION

The ability to efficiently generate harmonics of a pump radiation is of considerable interest in various fields of science and technology. For example, it is of interest for high information density optical recording and/or playback systems, and for laser printers for facsimile and typesetting systems.

As is well known, the maximum density of information stored in an optical storage medium such as an optical disc is inversely related to the wavelength of the radiation used to record the data in the storage medium and/or the wavelength of the radiation used to read the stored data. Currently available semiconductor lasers, considered to be the most advantageous light sources for optical data storage and/or retrieval, typically emit radiation in the near infrared portion of the electromagnetic spectrum.

In order to be able to utilize solid state laser devices and yet to achieve the advantages obtainable through the use of relatively short wavelength radiation, it has been proposed to use a second harmonic generator to double the frequency (half the wavelength) of the radiation emitted by a solid state laser diode.

One approach to harmonic generation utilizes an optical waveguide formed in lithium niobate or other optically nonlinear, birefringent material such as KDP (potassium dihydrogen phosphide). See, for instance, U.S. Pat. No. 3,619,795, and *Electronics*, July 10, 1986, p. 36. Such harmonic generators typically require delicate independent adjustments of the ordinary and extraordinary refractive indices in the waveguide region, which may make it difficult to achieve proper phase-matching over the required length of waveguide. See M. Papuchon et al., SPIE, Vol. 578, *Integrated Optical Circuit Engineering II*, (1985), pp. 150–155.

Another approach to harmonic generation, the one of interest herein, utilizes a multilayer planar waveguide with at least one of the layers of the structure consisting of an optically nonlinear material. The refractive indices and thicknesses of the layers are chosen such that phase-matching occurs between a predetermined mode of the pump radiation and a predetermined mode of the harmonic radiation that is generated through the interaction of the pump radiation with the nonlinear material of the structure. See, for instance, U.S. Pat. No. 3,430,061, which discloses a four-layer waveguide structure with variable voltage bias.

The coupling in the waveguide between the appropriate mode of the pump radiation and the phase-matched mode of the harmonic radiation is proportional to a coupling integral $I = \int D(x) g_f^2(x) g_h(x) dx$. In this expression, x is the spatial coordinate along the direction perpendicular to the layers, $D(x)$ is the material-dependent nonlinear susceptibility, and $g_f(x)$ and $g_h(x)$ are the appropriate field amplitudes of the phase-matched modes of the pump and the harmonic radiation (e.g., $TE_o$ and $TM_1$), respectively. In order to obtain efficient generation of harmonic radiation, it is necessary that the absolute value of the coupling integral be relatively large. This value clearly is directly related to the value of $D(x)$. However, since for an harmonic radiation mode of odd symmetry the value of $g_h(x)$ is positive over part of the range of integration and negative over the remainder, the absolute value of I can be small, due to this sign cancellation, even if $D(x)$ should be relatively large.

The simplest prior art multilayer waveguide harmonic generator uses a three-layer waveguide, in which an optically nonlinear core layer is bounded on both sides by an optically linear cladding layer. In such a structure, in the typical case in which a pump radiation mode of even symmetry ($TE_o$) is phase-matched with an harmonic radiation mode of odd symmetry (e.g., $TM_1$), the coupling integral is generally quite small, due to the above-described sign cancellation. Thus, the generation efficiency of the harmonic radiation is low in this prior art harmonic generator.

A waveguide structure that substantially circumvents the sign cancellation problem has been disclosed by H. Ito and H. Inaba, *Optics Letters*, Volume 2(6), June 1978, pp. 139–141. The disclosed structure consists of two core layers of relatively high refractive index that are bounded on both sides by (typically, but not necessarily, optically linear) cladding layers of relatively low refractive index. One of the two core layers consists of optically nonlinear material, whereas the other consists of optically linear material. In a structure of this type, sign cancellation can be substantially avoided since $D(x)$ is zero in the optically linear portions of the waveguide. However, the energy of the guided harmonic radiation is typically about equally divided between the linear and the nonlinear core layers, but only the nonlinear layer contributes to the coupling. Coupling therefore is still relatively small.

Despite the fact that the value of the coupling integral for the prior art four-layer structure can be greater than for the three-layer waveguide, the conversion efficiency obtainable with the four-layer prior art device is still relatively low. For instance, in the above-referred to paper by Ito et al, it is stated that a 0.1% conversion efficiency can be obtained for a fundamental mode power of 100 mW and a 1 mm interaction length for an optimized structure of glass-ZnS-TiO$_2$-air. This low coupling efficiency is in part due to the inherent coupling limitations of the disclosed four-layer harmonic generator, and in part to the use of polycrystalline materials in the core layers (ZnS and TiO$_2$). Although a polycrystalline ZnS film is known to have non-zero second order optical nonlinearity, the effective nonlinearity of polycrystalline ZnS film is substantially lower than that of single crystal ZnS.

Furthermore, in order to obtain a device having a conversion efficiency close to the calculated optimal efficiency, it is necessary that the thickness of the core layers be closely controlled, and be uniform over the length of the waveguide. The coupling efficiency in the prior art four-layer structure has a relatively strong dependence on layer thickness (see, for instance, FIG. 2 in the above referred to reference). Phase-matching over the length of the waveguide (typically several mm) may thus in practice be difficult to achieve in the prior art structure.

In view of the commerical significance of apparatus that comprises efficient harmonic generation means, harmonic generation means of the multi-layer type that can have substantially higher conversion efficiency than prior art multi-layer harmonic generators would be of considerable interest. This application discloses such a harmonic generator. The disclosed novel waveguide structure furthermore can serve as a parametric amplifier and/or oscillator.

GLOSSARY AND DEFINITIONS

The "pump" radiation herein is the radiation of frequency $f_o$ that is coupled into the harmonic generation means, and the "harmonic" radiation is the radiation of frequency $mf_o$ (where m is an integer greater than 1), that is generated from the pump radiation in the harmonic generation means.

"Optically nonlinear" material, or simply "nonlinear" material, herein is material having a nonzero ($m^{th}$ order) dielectric susceptibility coefficient $\chi^m$, where m is an integer greater than 1.

The modes of the guided radiation are specified in the customary way as (substantially) transverse electric (TE) and (substantially) transverse magnetic (TM), with a subscript indicating the order of the mode.

The index of refraction (n) of a material is considered to be the index of refraction at $f_o$, unless stated otherwise.

SUMMARY OF THE INVENTION

Disclosed are multilayer waveguide harmonic generation means of potentially relatively high conversion efficiency. The improved efficiency is due, inter alia, to a novel waveguide structure that can result in a substantially greater value of the coupling integral than was achievable with prior art multilayer waveguide structures.

In a broad sense, the novel waveguide structure comprises a planar multilayer core region that is bounded both above and below by (typically optically linear) cladding regions. The core region comprises a first and a second optically nonlinear layer separated by an optically linear spacer having a refractive index that is smaller than the refractive indices of the two nonlinear layers. The refractive indices, layer and spacer thickness are selected such that the core region forms a waveguide for the pump radiation, and such that a subset of the layers of the multilayer core region (e.g., one of the two nonlinear layers) forms a waveguide for a predetermined mode of the harmonic radiation. The refractive indices, layer and spacer thicknesses are further selected such that the effective refractive index of the waveguide for a predetermined mode of the pump radiation is essentially equal to the effective refractive index of the waveguide for the predetermined mode of the harmonic radiation. If the latter condition is satisfied, the pump radiation mode and the harmonic radiation mode are phase-matched, and harmonic generation can result. Typically, at least 50% of the total energy of the predetermined pump radiation mode propagates in the core region, and more than 50% (preferably at least 75% or 90%) of the total energy of the predetermined harmonic radiation mode propagates in the subset of the layers of the core region.

The two nonlinear layers have refractive indices $n_1$ and $n_2$, and the linear spacer has refractive index $n_s$, with $n_s < n_1, n_2$. The refractive indices of the bottom and top cladding regions ($n_b$ and $n_t$, respectively), are less than both $n_1$ and $n_2$.

The inventive waveguide structure is designed such that the effective refractive index of the pump radiation waveguide depends, inter alia, on the thickness of the spacer, but that the effective refractive index of the harmonic radiation waveguide(s) does not strongly depend on the thickness of the spacer. Phase-matching between the pump radiation mode and the predetermined harmonic radiation mode can then be attained by appropriate choice of spacer thickness, once the materials that are to make up the optically active region are selected. It will be appreciated that a multilayer waveguide structure according to the invention typically is able to guide not only the predetermined harmonic radiation mode, but also one or more other harmonic radiation modes. However, since only the predetermined mode is phase-matched with the pump radiation, only the predetermined mode is excited to any significant degree.

The inventive multilayer waveguide structure is typically formed by successively depositing layers on an appropriate substrate, e.g., a GaAs wafer. However, portions or all of one or both of the cladding regions and/or of the spacer could be air (void). Such waveguide structures could be produced by known etching techniques and may be advantageously used in some applications. Furthermore, the inventive waveguide means can comprise other layers, linear and/or nonlinear, in addition to the abovedescribed five layers.

In preferred embodiments, the first and second nonlinear layers are substantially monocrystalline, so as to provide the maximum effective nonlinearity obtainable with the given material, and so as to minimize light scattering in the layers. This generally requires that the lower cladding and the linear spacer comprise substantially monocrystalline material. Exemplarily, the first and second nonlinear layers can consist substantially of III-V and/or II-VI compound semiconductor material, and the lower cladding and the spacer layer of a crystalline dielectric material such as $CaF_2$ and/or $Ca_xSr_{1-x}F_2$, with $0 \leq X < 1$.

The monocrystalline semiconductor layers can have relatively large intrinsic nonlinearity, thus the value of $D(x)$ in the above referred to coupling integral can be relatively large. In combination with the use of the novel waveguide structure, the large $D(x)$ can result in a coupling integral that is substantially larger than for prior art devices. Harmonic conversion devices according to the invention advantageously have conversion efficiencies of 5% or more, preferably at least 10%, for a path length of 2 mm, for a pump power of 10 mW per $\mu$m of guide width in the lateral direction. It will be appreciated that at least the optically active layers of the multilayer waveguide (i.e., those in which a non-negligible portion of the total guided wave energy is propagating) are to be substantially transparent (loss typically less than 3 db/mm) to the radiation propagating therethrough. Exemplarily, the pump radiation is substantially in the $TE_o$ mode, and the harmonic radiation is in the $TM_1$ mode.

Apparatus according to the invention typically comprises, in addition to the multilayer waveguide structure, a source of substantially coherent pump radiation (e.g., a semiconductor laser diode emitting in the near infrared, exemplarily at 1.3 $\mu$m), and means for utilizing the radiation generated in the waveguide structure.

The harmonic radiation-utilizing means exemplarily comprise optical information storage means such as an optical disk. If the apparatus is adapted for storing information in the storage medium, then the harmonic radiation is caused to be incident on the storage medium, thereby locally changing some appropriate characteristic of the medium, and the apparatus further comprises means for changing the intensity of the harmonic radiation incident on the storage means in response to a signal. For instance, an electronic signal can be used to modulate the output of a laser diode such as to produce a sequence of pulses. Such techniques are well known in the art.

If the apparatus is adapted for read-out of information stored in some appropriate information storage medium (e.g., an optical disk, or a compact disk), then the harmonic radiation-utilizing means typically comprise photodetector means (e.g., a photodiode), the harmonic radiation is caused to interact with (e.g., be reflected by, or transmitted through) the storage medium, and the harmonic radiation is detected, after interaction with the storage medium, by the photodetector means.

As is known in the art, phase-matched waveguide structures can also serve as parametric amplifiers and/or parametric oscillators. If used as a parametric amplifier, typically CW short wavelength radiation (the pump) and long wavelength signal radiation are coupled into the waveguide, with more signal radiation (as well as so-called "idler" radiation whose frequency is the arithmetic difference between pump and signal frequency) being generated through nonlinear interaction. The pump and signal modes are phase-matched, and frequently (but not necessarily), the pump and signal frequencies are harmonically related. Parametric amplifiers of this type can find use, for instance, in optical communications systems, or in scientific apparatus.

The same multilayer waveguide structure that serves to parametrically amplify the signal radiation can also serve as a parametric oscillator. In this case, pump radiation of frequency $f_o$ is coupled into the waveguide structure, but no external signal radiation needs to be introduced. Instead, the pump radiation is phase-matched to some noise radiation of frequency $f_1$ that is inherently present in the waveguide structure, and nonlinear interaction results in the generation of more phase-matched radiation at $f_1$, to be referred to as "oscillator" radiation. As in the case of parametric amplification, $f_o = pf_1$, with p being a number greater than 1. Typically, but not necessarily, an optical cavity is provided so as to cause repeated passage of the oscillator radiation through the waveguide structure. Furthermore, typically filter means are provided for separating the oscillator radiation from the pump (and possibly idler) radiation.

BRIEF DESCRIPTION OF SOME PREFERRED EMBODIMENTS

Figure 2:
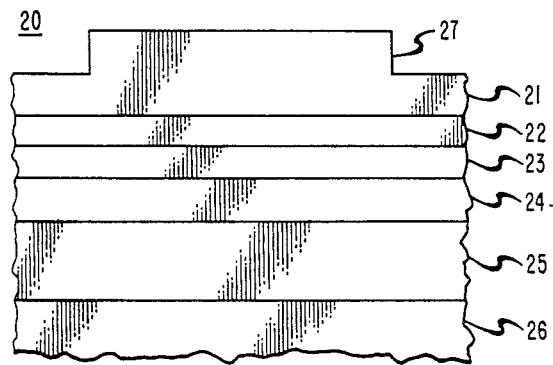
FIG. 2 shows schematically in end view a five-layer waveguide structure according to the invention.

Currently preferred embodiments of the invention typically comprise multilayer waveguide means such as are depicted schematically in FIG. 2. The waveguide structure 20 consists of five optically active layers, with the lower cladding layer 25 deposited typically on an appropriate substrate 26, e.g., a (100) oriented GaAs wafer or chip. Exemplarily, 25 is a 1 $\mu$m layer of substantially monocrystalline $Ca_{0.5}Sr_{0.5}F_2$, epitaxial with the substrate layer 26, and grown thereon by molecular beam epitaxy (MBE). Layer 24 is a nonlinear layer, exemplarily a 108 nm substantially monocrystalline layer of a ternary III-V semiconductor (e.g., $Al_{0.4}Ga_{0.6}As$ or, more generally, $Al_yGa_{1-y}As_1$, with $0.3 \leq y \leq 1$), epitaxial with 25, and grown also by MBE. See, for instance, U.S. Pat. No. 3,830,654, which discloses MBE growth of epitaxial single crystal GaAs on $CaF_2$. Spacer layer 23 exemplarily is a 92.5 nm substantially monocrystalline layer of approximate composition $Ca_{0.5}Sr_{0.5}F_2$, deposited by MBE, and nonlinear layer 22 exemplarily is 120 nm of MBE-deposited $Al_{0.78}Ga_{0.22}As$, substantially monocrystalline and epitaxial with layer 23. Finally, cladding layer 21 exemplarily is 1 $\mu$m of sputter-deposited $Ta_2O_5$ in which a ridge 27 is formed by standard lithography and etching techniques. The ridge, exemplarily of width about 5 $\mu$m, serves to provide lateral confinement of the guided radiation. Other ways to achieve lateral confinement are known to those skilled in the art and do not require further elaboration.

Multilayer structures of the type shown in FIG. 2 can be produced by any appropriate technique, including, in addition to MBE, metalorganic chemical vapor deposition (MOCVD). The nonlinear layers can comprise any appropriate nonlinear material such as III–V and/or II–VI semiconductors such as AlGaAs, GaP, ZnSe, and ZnS.

For pump radiation of wavelength 1.3 $\mu$m layers 21 through 25 (consisting of the materials indicated as exemplary in the description of FIG. 2) have refractive indices 2.22, 3.02, 1.44, 3.02, and 1.44, respectively. At the first harmonic of the pump radiation, i.e., at a wavelength of 0.65 $\mu$m, the same layers have refractive indices 2.28, 3.25, 1.44, 3.58, and 1.44, respectively. In such a structure, with layer thicknesses indicated as exemplary in the above description of FIG. 2, the field amplitude of the $TE_o$ mode of the 1.3 $\mu$m pump radiation is as shown by line 30 in FIG. 3. It is apparent from the above refractive indices and from FIG. 3 that the core region of the waveguide structure, consisting of layers 22, 23 and 24, forms a structure whose effective refractive index is greater than that of either layer 21 or layer 25, and thus guides the pump radiation.

Figure 3:
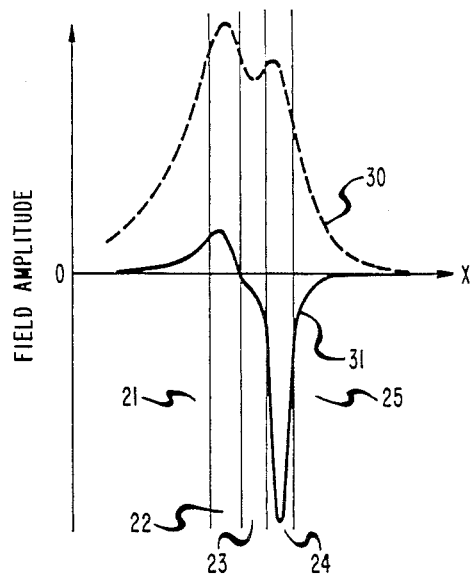
FIG. 3 shows the transverse electric field profile of the pump radiation ($TE_o$ mode) and the transverse magnetic field profile of the harmonic radiation ($TM_1$ mode) in an exemplary five-layer waveguide according to the invention.

The field amplitude distribution of the $TM_1$ mode of the harmonic radiation in the structure of FIG. 2 is also shown in FIG. 3 (curve 31). As can be seen, for the above-indicated choice of layer thicknesses and refractive indices, the energy of the phase-matched harmonic radiation mode is largely concentrated in nonlinear layer 24, with very little energy in nonlinear layer 22. By means of this nonsymmetrical energy distribution, the previously discussed sign cancellation is minimized. However, a different choice of thicknesses and indices, especialy of the two nonlinear layers, could be used to concentrate the phase-matched harmonic radiation in layer 22, if so desired.

Figure 4:
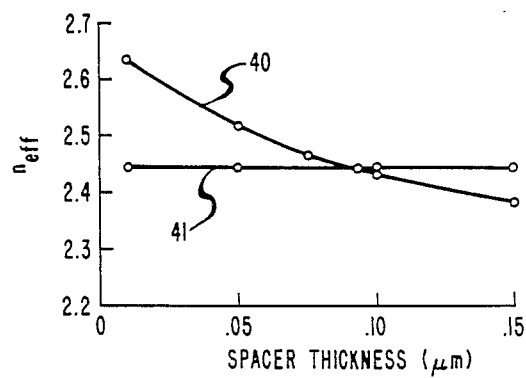
FIG. 4 shows the effective refractive index for the relevant modes of the pump and harmonic radiation, respectively, as a function of spacer layer thickness, in an exemplary five-layer waveguide according to the invention.

FIG. 4 shows the effective refractive index of the TE$_o$ mode of 1.3 μm pump radiation (curve 40) and of the TM$_1$ mode of the first harmonic of the pump radiation (curve 41), for the five layer structure as shown in FIG. 2, as a function of spacer thickness. As can be seen in FIG. 4, for this structure the effective refractive indices of the two modes are equal for a spacer thickness of 92.5 nm. This indicates that for the given combination of materials, phase-matching for the two modes occurs if a spacer layer thickness of 92.5 nm is used, resulting in efficient generation and guiding of the TM$_1$ mode of the harmonic radiation in such a structure.

Figure 1:
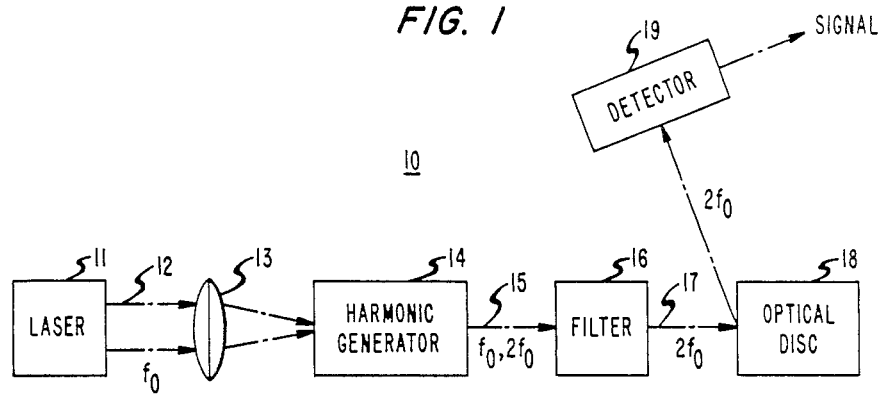
FIG. 1 schematically depicts exemplary apparatus according to the invention.

FIG. 1 shows exemplary apparatus 10 adapted for read-out of information stored in an optical storage medium, e.g., an optical disk. Laser 11 emits substantially coherent pump radiation 12, which is coupled by appropriate means, e.g., lens 13, into multilayer harmonic generator 14. The output 15 of the harmonic generator consists of pump radiation as well as harmonic radiation, e.g., the first harmonic of the pump radiation. Filter means 16 separate out the harmonic radiation 17 from the output beam. Beam 17 is caused to interact with optical disk 18, and the reflected radiation is detected by means of photodetector 19. The photodetector, e.g., a photodiode, provides an electronic output signal which can then be processed by known techniques.

It will be appreciated that FIG. 1 is exemplary only, and that other embodiments of the inventive apparatus are possible. For instance, means can be provided for appropriately modulating the intensity of the harmonic radiation that is caused to interact with an optical storage medium, and information can thereby be recorded on the storage medium. In such a (write-only) apparatus, detector means typically would not be required. Furthermore, apparatus adapted for both writing and reading of information is known to the art, and the inventive harmonic generation means can advantageously be utilized in such apparatus.

In apparatus that uses the inventive multilayer waveguide structure for parametric amplification, a source of pump radiation (e.g., a laser emitting radiation of frequency $f_o = pf_1$, where $f_1$ is the signal frequency, and p is a number greater than 1) is provided, and the appropriate mode of the pump radiation (e.g., TM$_1$) is coupled into the subset of the layers of the multilayer waveguide. The signal radiation, exemplarily being in the TE$_o$ mode, is also coupled into the core region of the waveguide structure, and is parametrically amplified, provided the respective modes are phase-matched. Subsequent to passage of the signal radiation through the multilayer structure, the radiation typically is filtered so as to remove the pump (and possibly idler) radiation from the output beam, and the amplified signal radiation is utilized in any appropriate fashion.

If the apparatus uses the multilayer waveguide structure as parametric oscillator, then the waveguide structure is typically introduced into an appropriate optical cavity, and no externally produced signal radiation need be provided. Filter means serve to separate the pump radiation (and possibly idler radiation) from the oscillator radiation, and means for utilizing the oscillator radiation are provided.

It will be apparent that in the inventive multilayer waveguide structure phase-matching between two radiation modes is generally achieved by appropriate choice of the spacing between the two nonlinear layers. This spacing need not necessarily be fixed, as it would be if a material spacer layer is used, but can be variable. Multilayer waveguides with variable spacing provide frequency tunability and are contemplated by us. Exemplarily, in such a waveguide structure, at least a portion of the material spacer layer is absent (e.g., having been removed by etching), such that the two nonlinear layers are separated by a void, and means are provided for changing the spacing between the two nonlinear layers. Such variable spacing may be useful for harmonic generation as well as for parametric amplifiers and oscillators.

What is claimed is:

1. Apparatus comprising a source of first electromagnetic radiation of frequency $f_o$; first means for generating second radiation of frequency $f_1$ from the first radiation, with $f_o \neq f_1$, the second radiation to be emitted from the first means; and means for utilizing the second radiation emitted from the first means;

characterized in that the first means comprise planar multilayer waveguide means capable of guiding at least one predetermined mode each of both the first radiation and the second radiation, the multilayer waveguide means comprising a core region, a bottom cladding region and a top cladding region, the bottom and top cladding regions bounding the core region from below and above, the bottom and top cladding regions having refractive indices $n_b$ and $n_t$, respectively, the core region having an effective refractive index greater than $n_b$ and $n_t$, the core region comprising a first and a second nonlinear layer and a linear spacer therebetween, the refractive indices of the first and second nonlinear layers and of the spacer being $n_1$, $n_2$, and $n_s$, respectively, with $n_s < n_1$, $n_2$, with $n_b$, $n_t$, $n_1$, $n_2$, $n_s$, and the thickness of the first and second nonlinear layer, the spacer layer, and the top and bottom cladding layer, respectively, chosen such that the predetermined mode of the first radiation is substantially phase-matched with the predetermined mode of the second radiation.

2. The apparatus of claim 1, wherein the first means are harmonic generation means, the first radiation is pump radiation, the second radiation is harmonic radiation, $f_1 = mf_o$, where m is an integer greater than 1, and more than 50% of the total energy of the predetermined mode of the harmonic radiation is propagating in a first part of the core region that does not contain the linear spacer and one of the two nonlinear layers.

3. The apparatus of claim 2, wherein m=2, wherein at least about 75% of the total energy of the predetermined mode of the harmonic radiation is propagating in the first part of the core region, and wherein the first part of the core region consists of one of the two nonlinear layers.

4. The apparatus of claim 2, wherein substantially all of the pump radiation is in the TE$_o$ mode, m=2, and substantially all of the harmonic radiation is in the TM$_1$ mode.

5. The apparatus of claim 1, wherein each of the first and the second nonlinear layer is a substantially monocrystalline layer.

6. The apparatus of claim 5, wherein the bottom cladding region and the spacer each consist essentially of the dielectric material selected from the group consisting of $CaF_2$ and $Ca_xSr_{(1-x)}F_2$, with $0 \leq x < 1$, and wherein the first and the second nonlinear layers each consist of semiconductor material selected from the group consisting of the III-V compound semiconductors and the II-VI compound semiconductors.

7. The apparatus of claim 6, wherein the bottom cladding region and the spacer each consists essentially of $Ca_xSr_{1-x}F_2$, the first and the second nonlinear layer each consists essentially of $Al_yGa_{(1-y)}As, 0.3 \leq y \leq 1$, and wherein the top cladding region consists substantially of $Ta_2O_5$.

8. The apparatus of claim 2, wherein the means for utilizing the harmonic radiation comprise an optical information storage medium, the harmonic radiation is caused to be incident on the storage medium, and the apparatus further comprises means for changing the intensity of the harmonic radiation incident on the storage medium.

9. The apparatus of claim 2, wherein the means for utilizing the harmonic radiation comprise photodetector means, the harmonic radiation is caused to interact with an optical storage medium and is detected, after the interaction with the storage medium, by the photodetector means.

10. The apparatus of claim 1, wherein the first means are parametric amplifier means, the first radiation is pump radiation, the second radiation is signal radiation, $f_o = pf_1$, where p is a number greater than 1, and more than 50% of the total energy of the predetermined mode of the pump radiation is propagating in a first part of the core region that does not contain the linear spacer and one of the two nonlinear layers.

11. The apparatus of claim 1, wherein the first means are parametric oscillator means, the first radiation is pump radiation, the second radiation is oscillator radiation, $f_o = pf_1$, where p is a number greater than 1, and more than 50% of the total energy of the predetermined mode of the pump radiation is propagating in a first part of the core region that does not contain the linear spacer and one of the two nonlinear layers.

12. The apparatus of claim 11, further comprising optical cavity means.

* * * * *